US012072149B2

(12) United States Patent
Britton et al.

(10) Patent No.: US 12,072,149 B2
(45) Date of Patent: Aug. 27, 2024

(54) EXTRACTION FREEZE DRYING SYSTEM WITH REMOVABLE CONDENSER

(71) Applicants: Benjamin Britton, Conifer, CO (US); Kyle Manuel, Arvada, CO (US)

(72) Inventors: Benjamin Britton, Conifer, CO (US); Kyle Manuel, Arvada, CO (US)

(73) Assignee: PurePressure, LLC, Denver, CO (US)

( * ) Notice: Subject to any disclaimer, the term of this patent is extended or adjusted under 35 U.S.C. 154(b) by 303 days.

(21) Appl. No.: 17/477,474

(22) Filed: Sep. 16, 2021

(65) Prior Publication Data

US 2023/0079635 A1 Mar. 16, 2023

(51) Int. Cl.
*F26B 5/06* (2006.01)

(52) U.S. Cl.
CPC ..................................... *F26B 5/06* (2013.01)

(58) Field of Classification Search
CPC ........................................................ F26B 5/06
USPC ............................................................. 34/92
See application file for complete search history.

(56) References Cited

U.S. PATENT DOCUMENTS 2,751,687 A * 6/1956 Colton ....................... B01J 2/00 264/28
3,270,432 A * 9/1966 Barbareschi ............. B01D 7/00 34/305
4,455,135 A * 6/1984 Bitterly ..................... F26B 5/06 34/92
5,822,882 A * 10/1998 Anger ....................... F26B 5/06 34/92
6,935,049 B2 * 8/2005 Alstat ....................... C02F 1/22 34/92
7,096,600 B2 * 8/2006 Singh ........................ G21F 9/34 34/494
7,713,421 B2 * 5/2010 Galbraith ............... B01D 53/02 210/663
8,061,056 B2 * 11/2011 Hedberg ................. B04B 15/08 118/52
9,278,790 B2 * 3/2016 McPherson .......... B65D 51/241
10,427,084 B1 * 10/2019 Rhodes, Jr. ............ B01D 46/56
11,047,620 B2 * 6/2021 Beutler ................. F26B 21/003
11,287,185 B1 * 3/2022 Jiang ......................... F26B 5/06
11,384,980 B2 * 7/2022 Triglia, Jr. ............ F26B 13/008
11,723,870 B1 * 8/2023 Harkins, Jr. ............. A61K 9/19 34/284
2023/0079635 A1 * 3/2023 Britton ...................... F26B 5/06 34/92
2023/0288116 A1 * 9/2023 Owens, III ................ F25C 1/14

FOREIGN PATENT DOCUMENTS

WO WO-2005081722 A2 * 9/2005 ............ B01D 15/00

* cited by examiner

*Primary Examiner* — Stephen M Gravini
(74) *Attorney, Agent, or Firm* — Blank Rome LLP

(57) ABSTRACT

An extraction freeze drying system. The freeze dryer has a cold collector, heating elements, and a vacuum chamber. A first removable collector vessel is operatively and removably connected to the freeze dryer. A second removable collector vessel is provided for replacing the first removable collector vessel upon removal thereof from the freeze dryer. The first and second removable collectors are jacketed vessels. Fluid is allowed to pass through the jacket to maintain proper temperatures. A sealable lid is attached to the first removable collector vessel immediately upon or prior to removal from the freeze dryer. The sealable lid comprises a drain valve and spout to aid in pouring off water or terpenes during the separation process.

7 Claims, 8 Drawing Sheets

EXTRACTION FREEZE DRYING SYSTEM WITH REMOVABLE CONDENSER

RELATED PATENT APPLICATION

The present application is related to U.S. provisional patent application for EXTRACTION FREEZE DRYING SYSTEM WITH REMOVABLE CONDENSER, application no. 63/079,107, filed Sep. 16, 2020, and hereby incorporates the teaching therein by reference.

FIELD OF THE INVENTION

The present invention pertains to freeze drying apparatus for extracting material and, more particularly, to a freeze drying system with a removable condenser for drying a frozen, wet sample of material and drying it to a low residual moisture content without exposing it to temperatures above a predetermined temperature during the process.

BACKGROUND OF THE INVENTION

Freeze drying or lyophilization is a process whereby water or other solvent is removed from frozen material by converting or sublimating the frozen water directly into vapor without the intermediate formation of liquid water. The frozen sample absorbs heat to vaporize the ice. A vacuum pump enhances the removal of water vapor from the surface of the sample. Water vapor is then transferred to a collector and then heat is removed by the collector to condense the water vapor. Therefore, the heat absorbed by the sample vaporizes the ice and the heat removed from the collector converts the water vapor into ice. In this way, the system utilizes a temperature delta between the sample temperature and the collector or cold trap, and vacuum pressure accelerates the transfer of moisture. Moisture always moves to the coldest surface, which is the collector. Heated shelves under the samples create an even larger temperature delta and drives the moisture faster. Accordingly, a frozen, wet sample can be dried to a residual moisture content of approximately 10% or lower without exposing the sample to temperatures about 40° F. during the process. Hash is essentially *cannabis* trichome heads suspended in water. Such trichome heads are delicate and melt at temperatures above approximately 40° F.

Freeze dryers have been used to dry ice water hash for many years without exposing the hash to elevated temperatures. The drying process occurs at temperatures well below 0° F. Directly after the hash washing process, the wet trichome heads are placed on a tray and frozen. Once those trays of material are fully frozen, they may be placed in the freeze dryer. Approximately 8 to 36 hours later, the hash is dry and ready to be further processed or sold. The moisture that was removed from the batch is then frozen to the collector. The operator must melt and remove that ice before he or she can run the dryer again. Most operators will notice that the water draining from the freeze dryer smells like the product they were drying. This is because terpenes have volatized and traveled with the moisture from the hash to the collector. Even the best freeze dryers and parameter settings will result in some terpene loss to the collector.

For years people have collected the ice, melted it down and allowed the terpenes to separate from the water. Then pouring off the water, they are left with terpenes. There are other more scientific means to separate these two that can be handled later. The key is to prevent the volatile terpenes from escaping during the melting and separation process. Simply letting the ice melt in the freeze dryer is often enough to lose the terpenes altogether but they must be completely enclosed and sealed before the temperature is elevated.

DESCRIPTION OF RELATED ART

U.S. Pat. No. 9,441,279 for MAPLE OR BIRCH WATER EVAPORATOR SYSTEM, issued on Sep. 13, 2016 to Caux, et al., discloses a system for producing maple syrup or birch syrup from maple or birch water, comprising an evaporating pan under controlled pressure, a condenser immersed in maple or birch water in the evaporating pan, and a compressor, pressurizing vapor generated by evaporation of maple or birch water in the evaporating pan, the condenser directing the pressurized vapor provided by the compressor to the maple or birch water within the evaporating pan, thereby further evaporating the maple or birch water and further generating vapor.

U.S. Published Patent Application No. 2005/0086950 for CLOSED CYCLE REFRIGERATION SYSTEM AND MIXED COMPONENT REFRIGERANT, published on Apr. 28, 2005 on an application by Khatri, discloses a closed cycle refrigeration system in conjunction with specific mixed or multiple component refrigerant fluids to produce temperatures in the range of 230° K. to 70° K. The mixed component refrigerant can be blended from flammable or non-flammable fluid components based upon the arrangement of the refrigeration equipment and the overall performance requirements for the system. A compressor, an after cooler, an oil separator, filter/dryer, heat exchanger, a throttle device with fixed orifice and an evaporator are arranged in a manner to improve system performance with refrigeration or prior art refrigerants. Replaceable additional modules for oil filtration and moisture filtration can be part of the system.

U.S. Pat. No. 6,564,471 for METHOD AND APPARATUS FOR FREEZE-DRYING, issued on May 20, 2003 to Sutherland, et al., discloses a method and an apparatus for effecting freeze-drying specimens containing solvents or condensing solvents having a shallow pan treatment chamber with little or no obstructions, holes or orifices. The treatment is effected by cooling the base of the chamber by using coolant-containing coils mounted beneath the base of the chamber. A source of vacuum is provided to the chamber by a conduit located in the cover, sidewalls or base of the chamber. The method and apparatus may employ a moveable specimen holder positioned in the chamber. The moveable specimen holder may be mounted on a perforated tube which slidably engages a conduit in the base of the chamber. The perforated tube may a conduit to the source of vacuum. The specimen holder may be supported by the perforated tube and by a rigid metal wire which is used to elevate the specimen holder above the base of the chamber. By varying the elevation of the specimen holder various treatments can be effected. The method and apparatus are applicable to manifold type freeze-drying and can be used simply as a cold trap.

U.S. Pat. No. 6,122,836 for FREEZE DRYING APPARATUS AND METHOD EMPLOYING VAPOR FLOW MONITORING AND/OR VACUUM PRESSURE CONTROL, issued on Sep. 26, 2000 to Tenedini, et al., discloses freeze drying apparatus and associated lyophilization procedures employing vapor flow detection and/or vacuum control for monitoring and control of the lyophilization process. The vapor flow detector, such as a windmill sensor, is disposed to monitor vapor flow from product undergoing lyophilization. In a batch process, vapor flow is collectively monitored with the vapor flow detector between the process chamber and condenser chamber, while in a manifold configuration separate vapor flow detectors are employed at each flask attachment port. A windmill sensor provides visual feedback to an operator and/or electronic feedback to a system controller. A vacuum control system is also provided for use with or independent of vapor flow detection. This vacuum control disconnects the vacuum source from the process chamber when pressure within the process chamber falls below a first predefined set point. The vacuum source is then reconnected if process chamber pressure rises above a second predefined set point.

U.S. Pat. No. 5,948,144 for LYOPHILIZER SYSTEM, issued on Sep. 7, 1999 to Cifuni, discloses apparatus and methods for lyophilization of protein and/or pharmaceutical products, wherein said apparatus utilizes a dry vacuum pump for the direct removal of water vapor, rather than a cold trap condenser. A freeze dryer has a vacuum pump which is connected directly to a drying chamber without the use of a cold trap condenser. The exhaust of the vacuum pump is vented directly to atmosphere. Water vapor generated in the process is directly removed from the chamber by the vacuum pump. The apparatus permits lyophilization of pharmaceuticals e.g. antibiotics, vitamins products, vaccines, and biological protein solutions. The dryer operates on a batch basis or may be designed to perform continuous production.

U.S. Pat. No. 4,033,048 for FREEZE DRYING APPARATUS, issued on Jul. 5, 1977 to Van Ike, discloses freeze drying apparatus in which a liquid product is sprayed into a freezing chamber to produce a frozen powder, which drops on to a multiple stage conveyor in a drying chamber under vacuum. The drying chamber is open to the freezing chamber and is also maintained at freezing temperature. The moisture content of the frozen powder is sublimated by microwave radiation, which does not heat the chamber or the conveyors and causes minimal temperature increase of the powder. The dry powder is carried on a further conveyor, through a microwave excluding choke, to a collection chamber. Cold water vapor is constantly removed from the drying chamber by the vacuum pump and condensed in a heat exchanger, from which the resultant ice is removed by microwave radiation to minimize temperature variations in the system.

SUMMARY OF THE INVENTION

In accordance with the present invention, an extraction freeze drying system is provided. The freeze dryer has a cold collector, heating elements, and a vacuum chamber. A first removable collector vessel is operatively and removably connected to the freeze dryer. A second removable collector vessel is provided for replacing the first removable collector vessel upon removal thereof from the freeze dryer. The first and second removable collectors are jacketed vessels. Fluid is allowed to pass through the jacket to maintain proper temperatures. A sealable lid is attached to the first removable collector vessel immediately upon or prior to removal from the freeze dryer. The sealable lid comprises a drain valve and spout to aid in pouring off water or terpenes during the separation process.

BRIEF DESCRIPTION OF THE DRAWING

A complete understanding of the present invention may be obtained by reference to the accompanying drawing, when considered in conjunction with the subsequent detailed description, in which.

DETAILED DESCRIPTION OF THE PREFERRED EMBODIMENT

Although the following detailed description contains specific details for the purposes of illustration, those of ordinary skill in the art will appreciate that variations and alterations to the following details are within the scope of the invention. Accordingly, the exemplary embodiments of the invention described below are set forth without any loss of generality to, and without imposing limitations upon, the claimed invention.

Figure 7:
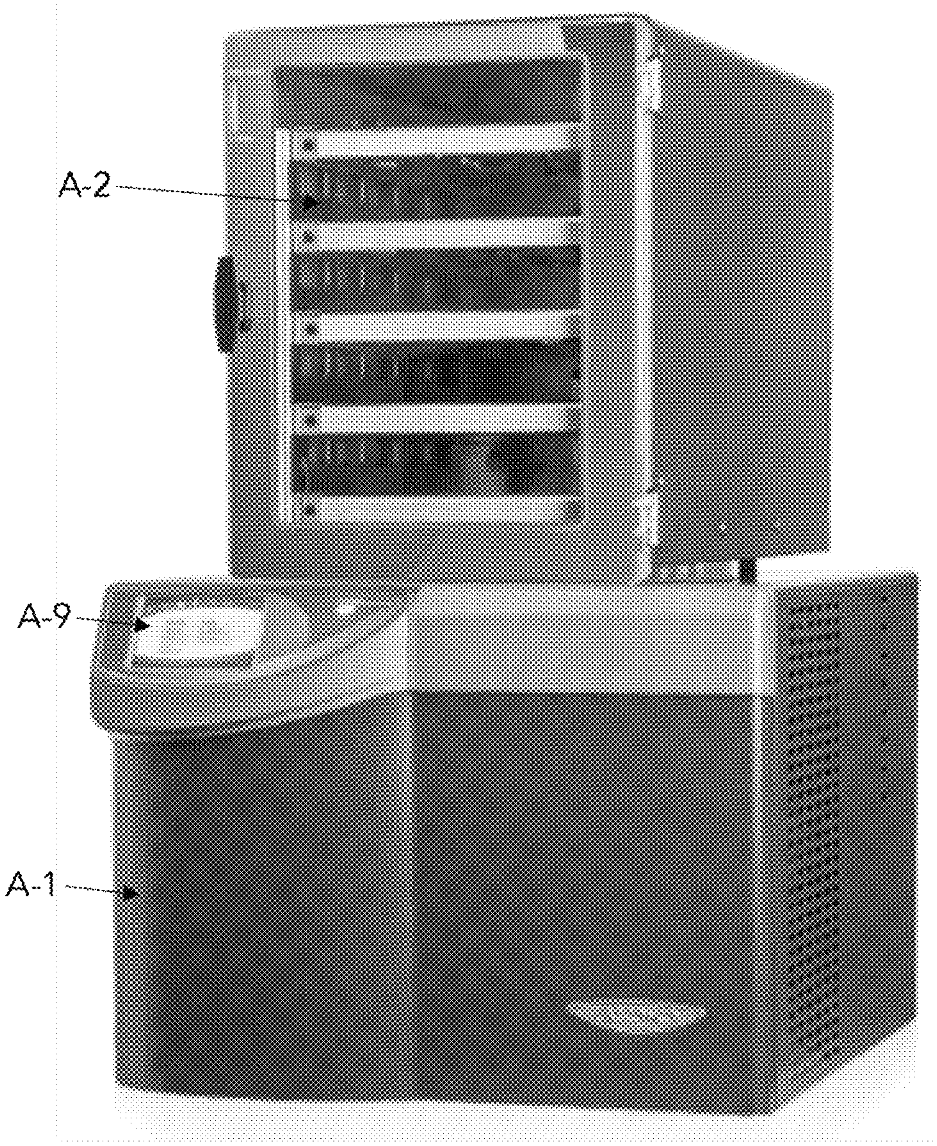
FIG. 7 Prior Art
FIG. 7 is a perspective view of an extraction freeze dryer of the prior art.

Referring now to FIG. 7, there is shown a perspective view of an extraction freeze dryer of the prior art. Specifically, an extraction freeze dryer manufactured by the Labconco Corporation of Kansas City, MO. is depicted. It should be understood that other extraction freeze dryers can be used equally well with the present invention, but for simplicity, only the Labconco freeze dryer is described hereinbelow.

A housing A-1 contains components, not shown, for freeze drying material. Housing A-1 supports a plurality of stainless steel trays supported by shelves A-2, preferably heated, for collecting ice and water that are produced during the freeze drying process. Mounted to the exterior of housing A-1 is a control panel assembly A-9 that includes a touch screen display.

Figure 8:
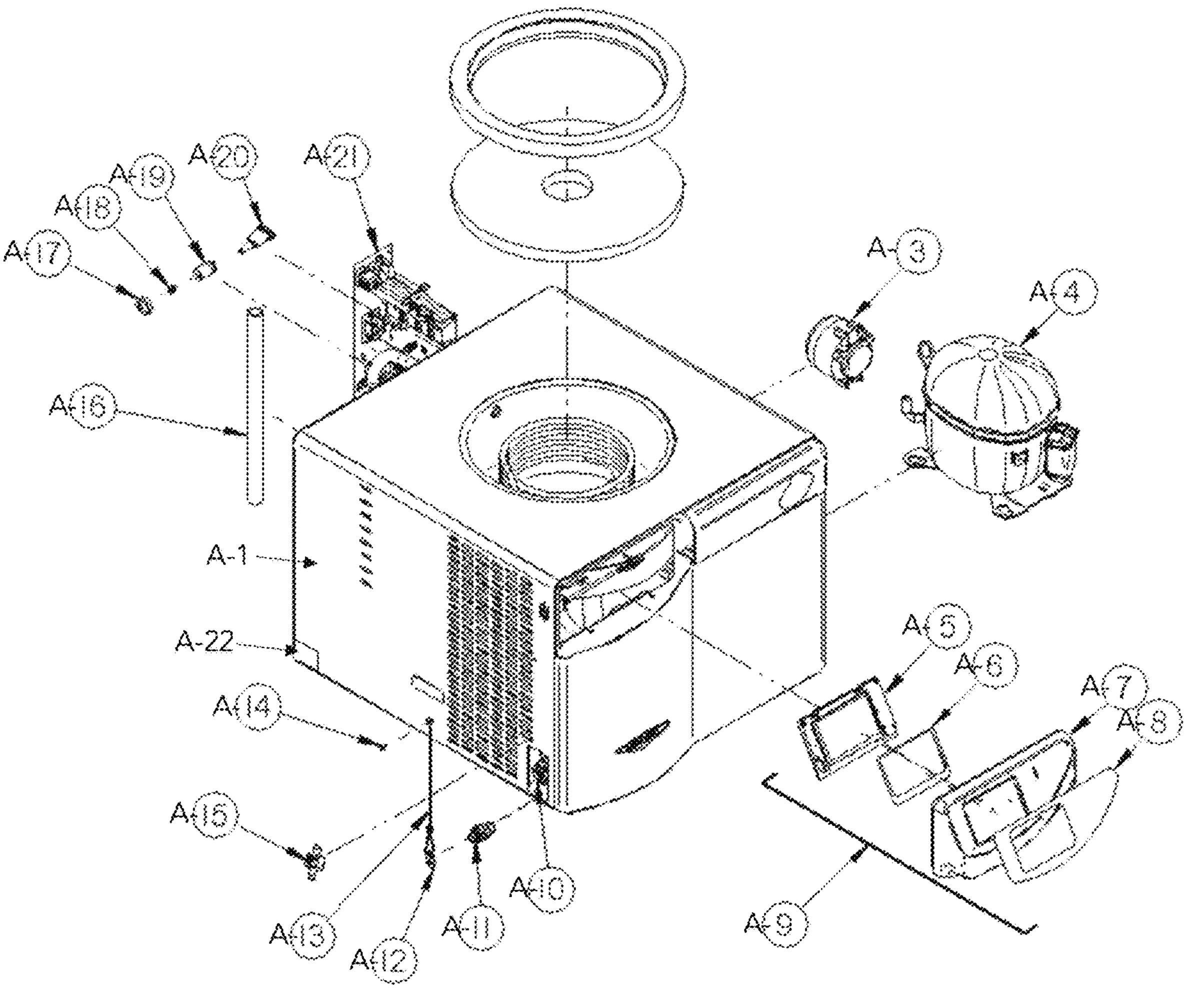
FIG. 8 Prior Art
FIG. 8 is an exploded view of the extraction freeze dryer of the prior art shown in FIG. 7.

Referring now also to FIG. 8, there is shown an exploded view of the extraction freeze dryer of the prior art shown in FIG. 7. Instructions for operating the prior art extraction freeze dryer are provided by the Labconco Corporation.

Housing A-1 encases a 9-Watt motorized fan A-3, which can be a 115V or a 230V model and a compressor A-4, which can be a 115V, 60 Hz, a 230V, 50 Hz, or a 230V, 60 Hz model. Control panel assembly A-9, including display assembly A-5, display gasket A-6, control panel A-7, and control panel label A-8, is mounted to the exterior of housing A-1, as hereinbefore described. A drain fitting or coupling body A-10 is disposed at a lowermost portion of housing A-1 and a coupling insert A-11 is inserted therein. A retaining ring A-12 and drain fitting lanyard A-13 are likewise disposed at a lowermost portion of housing A-1, fastened by a machine screw A-14. A moisture sensor A-15 is operatively connected to the exterior of housing A-1. A vacuum hose A-16 is mounted on housing A-1. A female luer-lok filter A-17, a male luer A-18, a vacuum control/bleed valve A-19, and a vacuum sensor A-20 are all connected to one another and mounted on housing A-1, as shown. An electrical panel assembly A-21, which can be a 115V or a 230V model, is inserted in a cavity in housing A-1. A temperature sensor A-22 is also mounted on housing A-1.

Now referring to the present invention, a freeze drying system is provided with a first removable collector or condenser that can be capped, sealed, and processed offline to collect terpenes from an ice/water mixture. Another collector or condenser, not shown, is ready and staged to be placed into the freeze dryer immediately after the full first collector is removed, thus reducing the down time between cycles, and realizing a greater overall efficiency.

Figure 1:
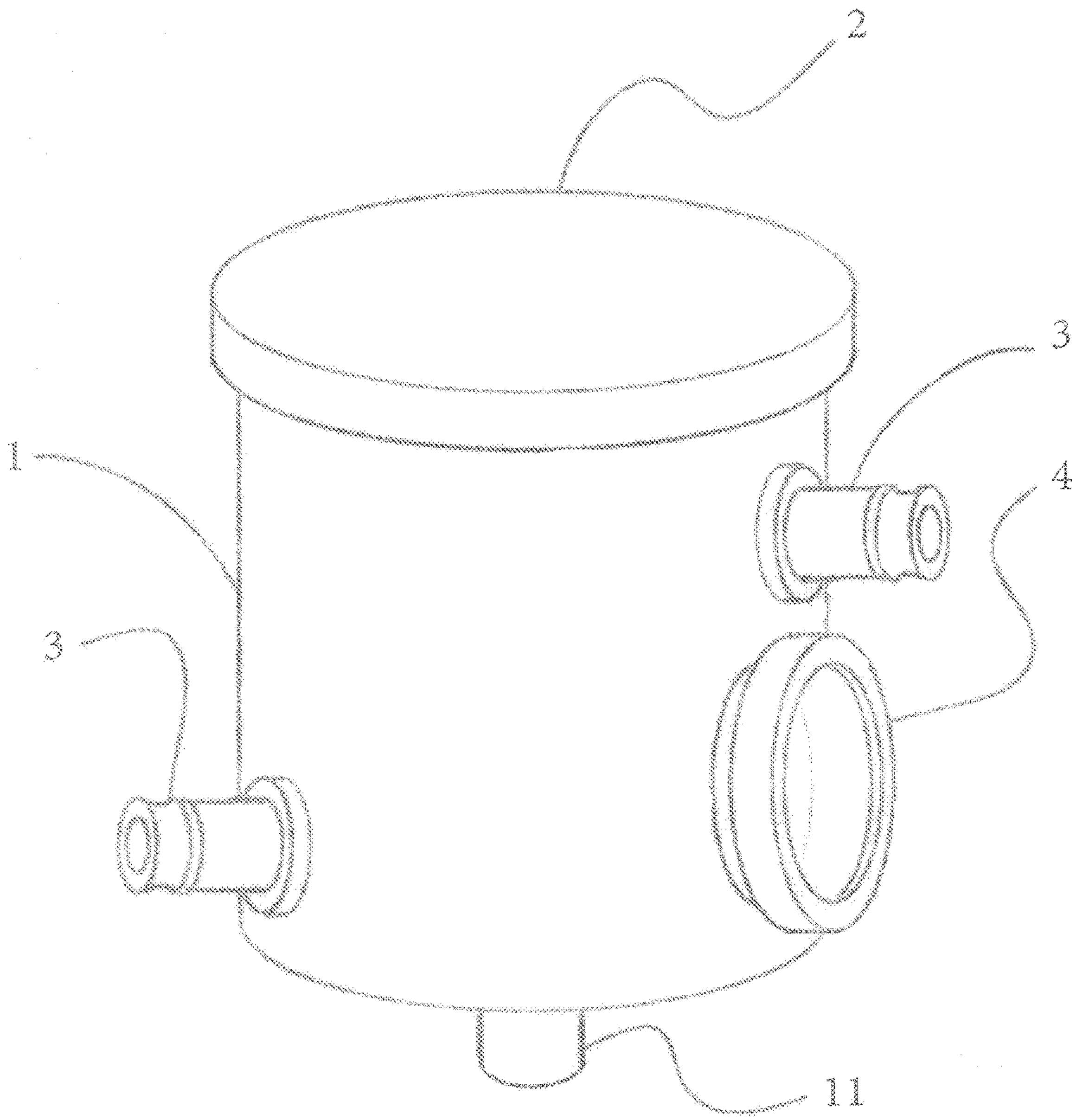
FIG. 1 is a perspective view of a removable condenser in accordance with the present invention.
Figure 2:
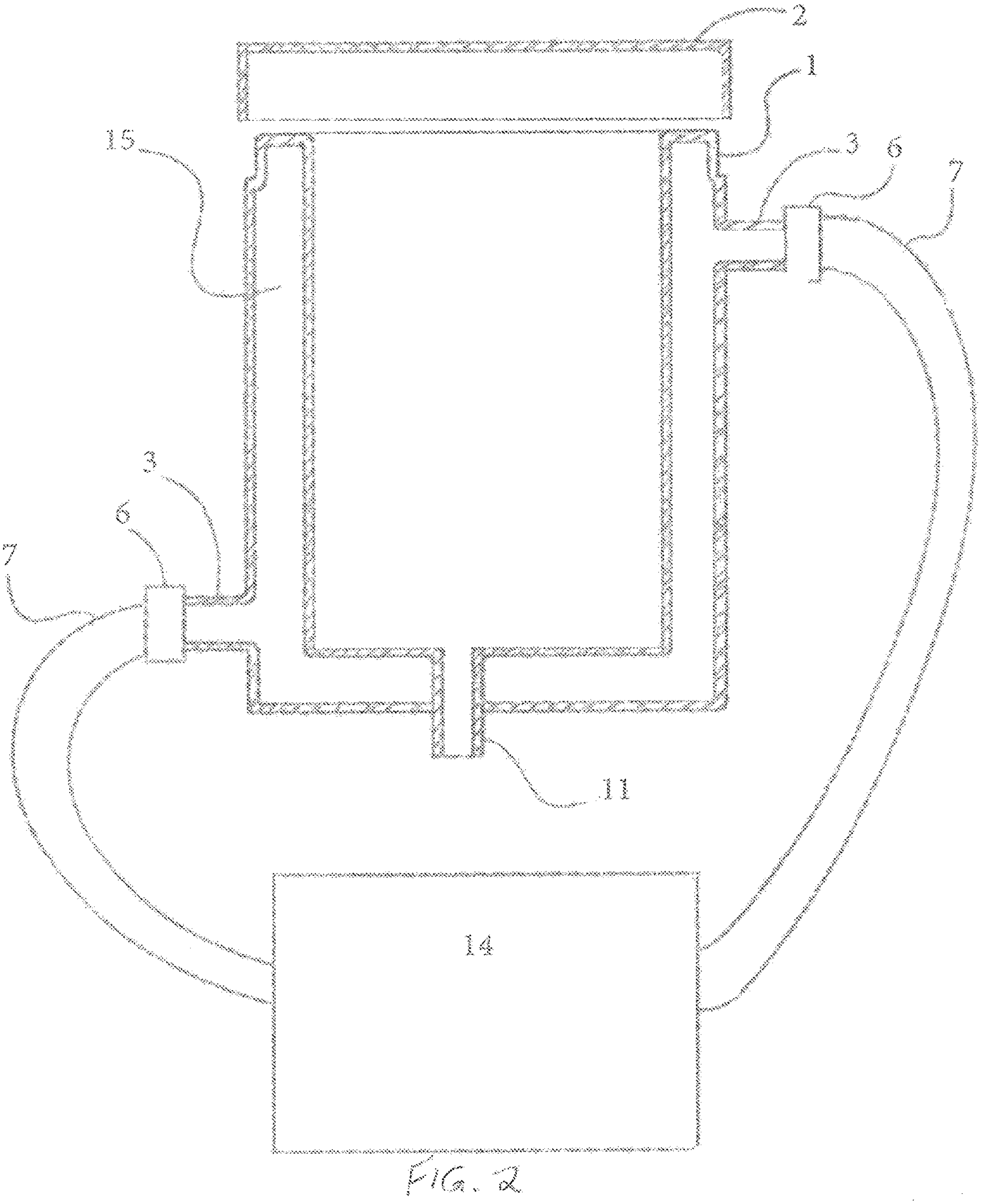
FIG. 2 is a cut-away schematic view of an alternative embodiment of the removable condenser and refrigeration system of FIG. 1.

The inventive removable collector 1 may be a jacketed vessel 15 with fluid 5 passing through the jacket to maintain proper temperatures (FIGS. 1 and 2). Quick disconnect fittings 6 allow the jacketed vessel 15 to be removed without leaking fluid.

Figure 3:
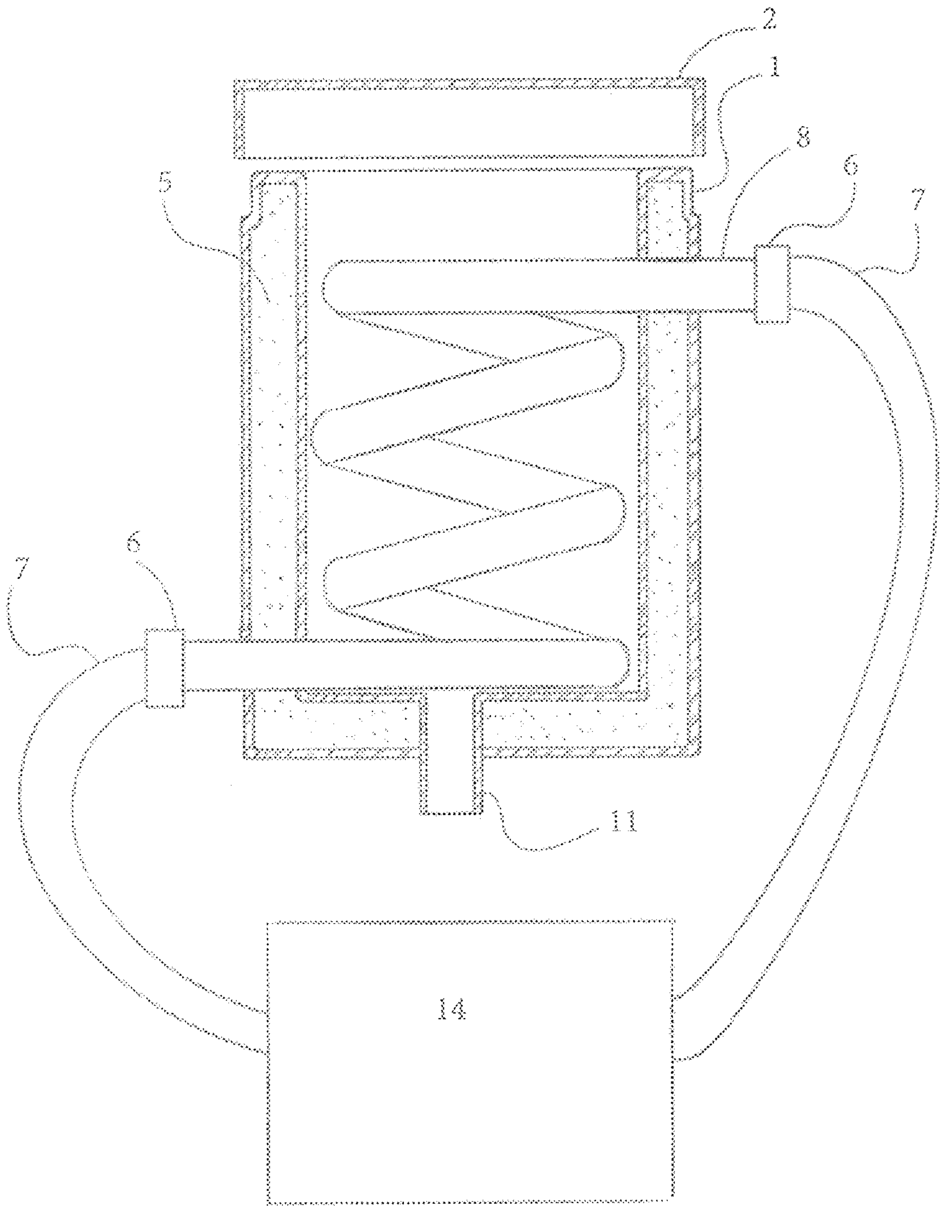
FIG. 3 is a cut-away schematic view of another alternative embodiment of the removable condenser and refrigeration system of FIG. 1 showing a refrigerator coil.
Figure 4:
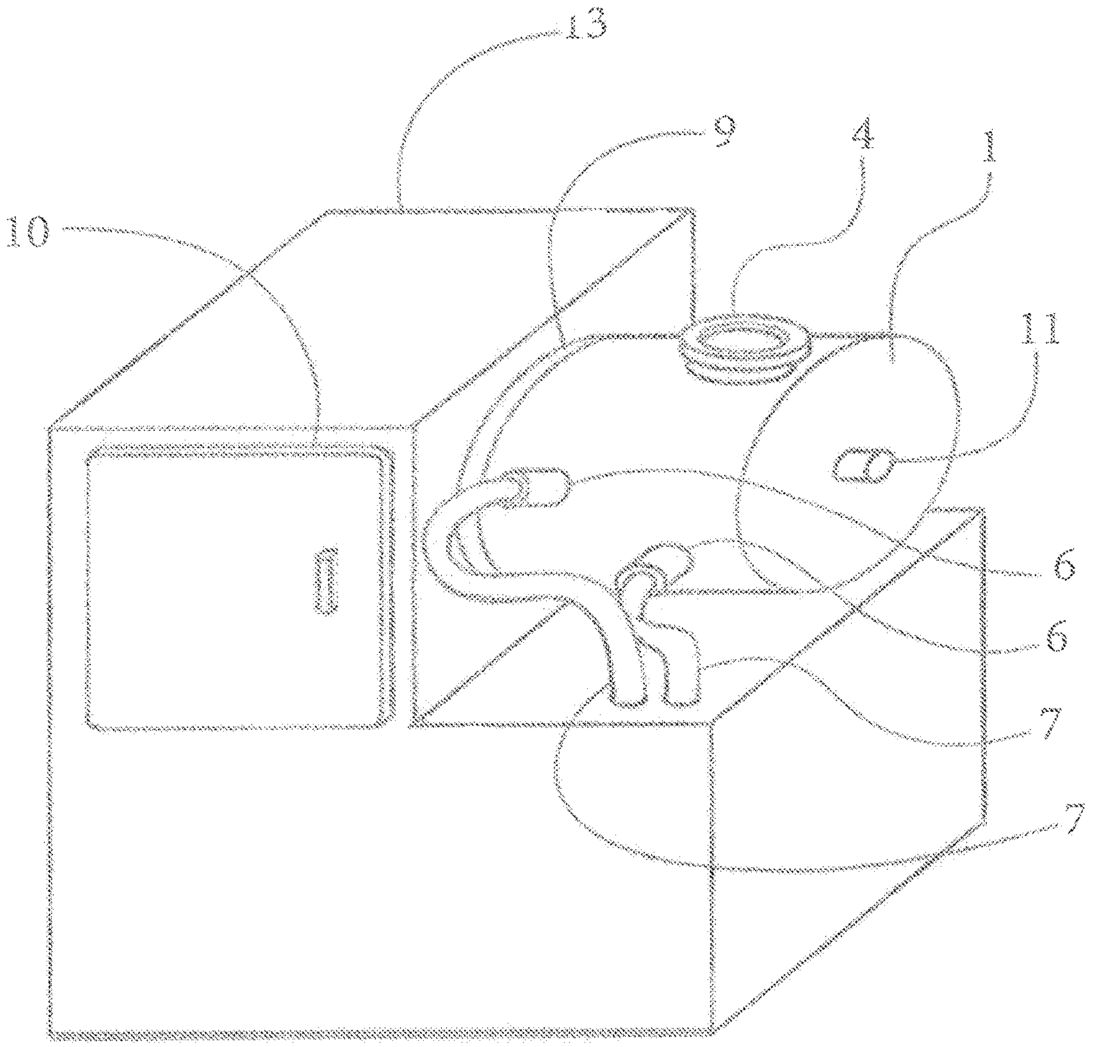
FIG. 4 is a perspective view of the inventive removable condenser as shown in FIG. 1, mounted on a conventional freeze dryer, showing external refrigeration fittings.

In an alternate embodiment (FIGS. 3 and 4), a removable vessel 1 is provided with a refrigeration coil inside the housing thereof. Quick disconnect fittings 6 allow the coil 8 to be disconnected without leaking fluid.

Figure 5:
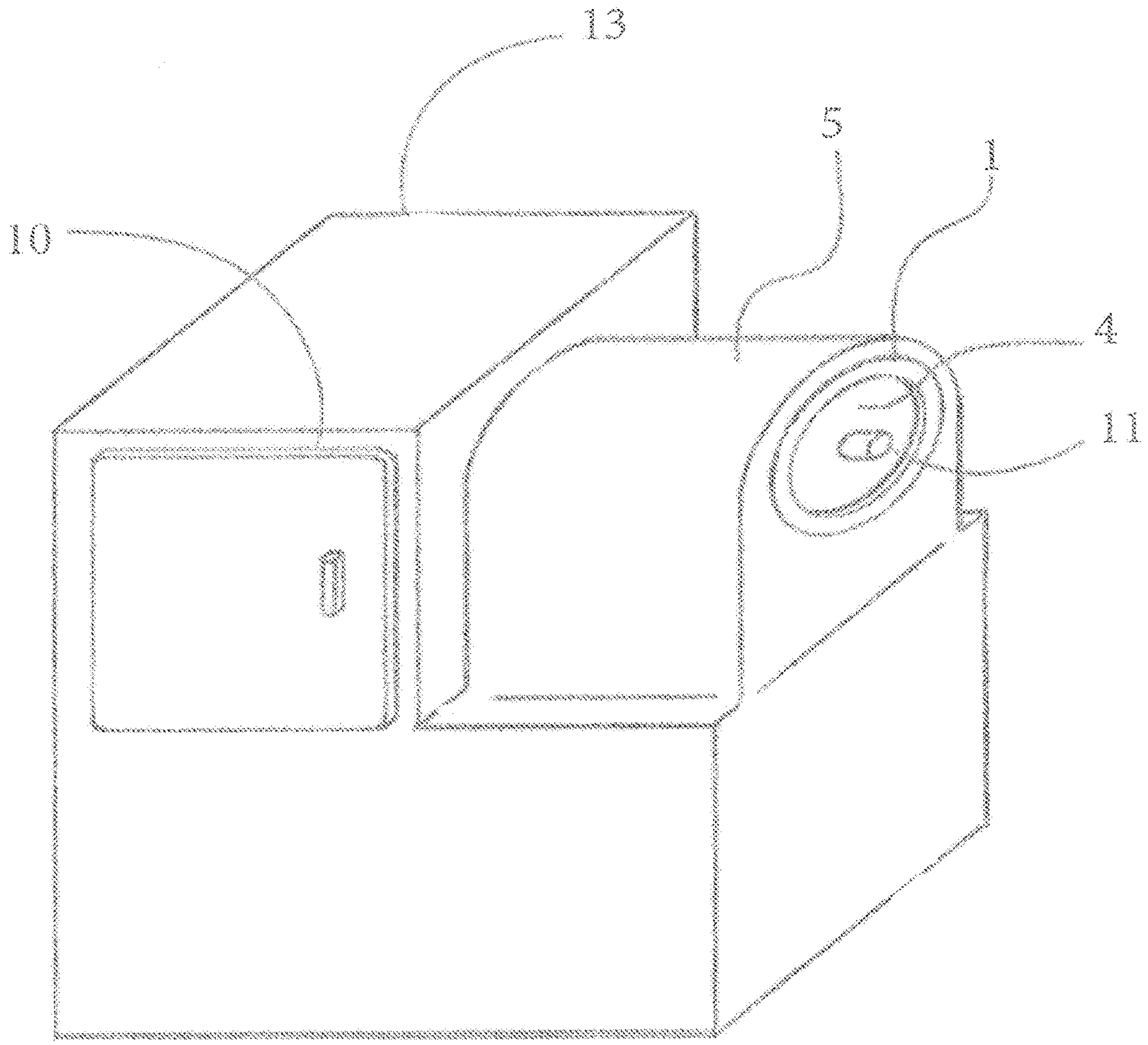
FIG. 5 is a perspective view of an alternate embodiment of the inventive removable condenser as shown in FIG. 4, mounted on a conventional freeze dryer, with internal refrigeration fittings.
Figure 6:
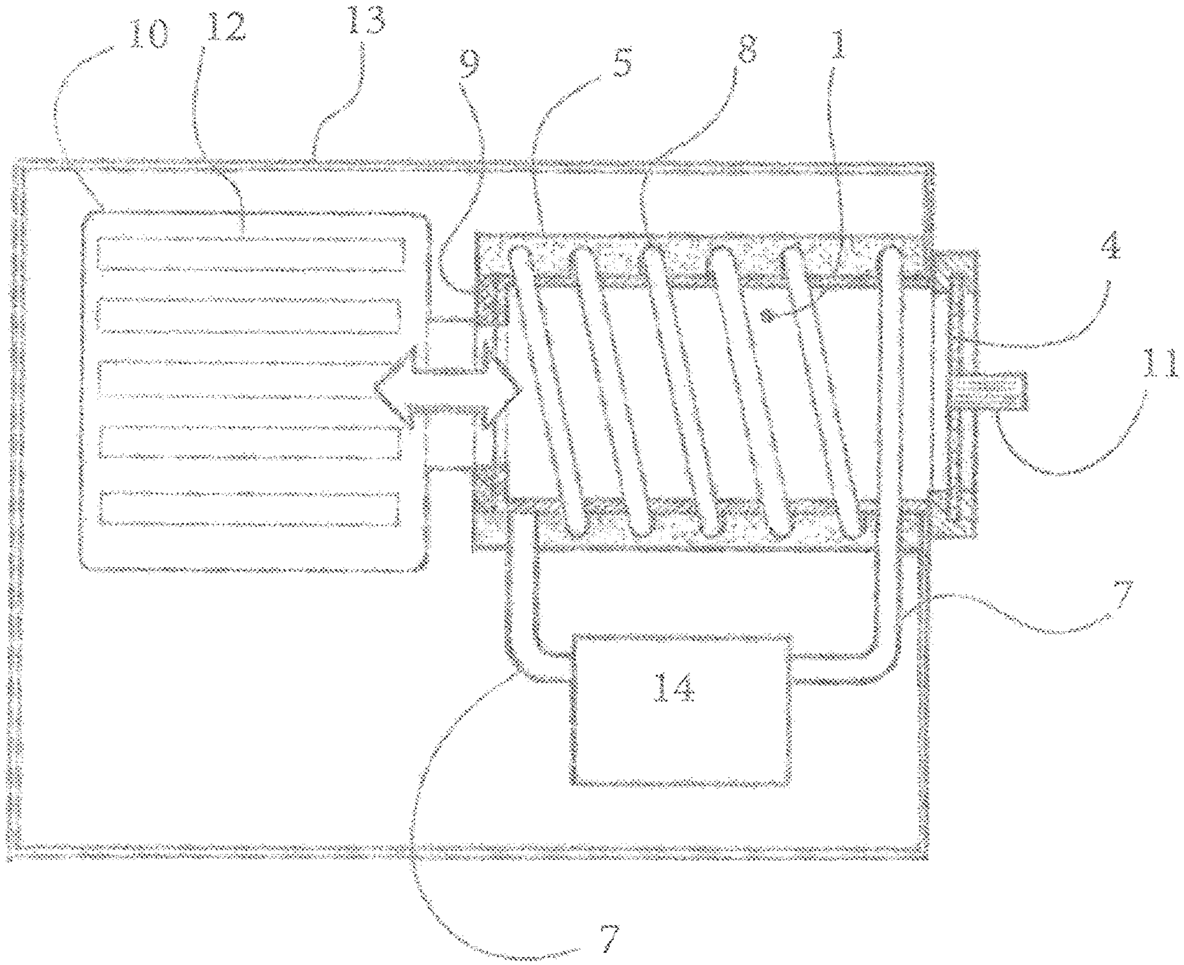
FIG. 6 is a cut-away view of the inventive removable condenser as shown in FIG. 5, illustrating a vacuum chamber and a plurality of shelves.

In another alternate embodiment (FIGS. 5 and 6), a removable vessel 1 fits inside of a fixed coil 8 which transfers chilled air from coil 8 to the inner wall of removable vessel 1. The thermal transfer occurs via fitment, or a medium may aid the thermal transfer.

In all embodiments, a sealable lid 2 attaches to the vessel 1 immediately upon or prior to removal from the freeze dryer. It may encompass a drain valve 11 and spout to aid in pouring off water or terpenes during the separation process. A sight glass or view port 4 on vessel 1 allows the user to monitor condensate collection during the drying process. A proper gasket/seal 9 and insulation ensures that the condensate collects only within the vessel and not on the flange or the exterior thereof.

The location of the removable collector or condenser 1 may be oriented for easy access and removal. Locating the collector 1 on the side of a tray-style freeze dryer allows for a short, unobstructed path from the tray to the collector.

Referring now again to FIG. 1, there is shown a perspective view of a removable condenser 1 in accordance with the present invention. Removable condenser 1 is mounted to a housing A-1 (FIG. 7) of a conventional freeze dryer. Condenser 1 has an airtight lid 2 at the uppermost portion thereof. Two vessel cooling entry/exit ports 3 extend from a lower portion and an upper portion, respectively, of condenser 1, as shown. A vessel site glass 4 is optionally and suitably positioned at the periphery of condenser 1 for observation of the extraction process. A drain port 11 extends from the lowermost surface of condenser 1.

Referring now again to FIG. 2, there is shown a cut-away schematic view of an alternative embodiment of removable condenser and refrigeration system 1 of FIG. 1. Two connect/disconnect fittings 6 are connected to respective vessel cooling entry/exist ports 3, as shown, at the termination of respective refrigeration supply/return tubes 7, both of which are connected to a refrigeration system 14.

Referring now again to FIG. 3, there is shown a cut-away schematic view of an alternative embodiment of the removable condenser and refrigeration system 1 of FIG. 1. Disposed along the inner surface of the housing of condenser 1 and surrounding components therein is a layer of thermal insulation 5 as is well known in the art. Thermal insulation 5 acts as a jacket and may be hollow to accommodate fluid passing through the jacket to maintain proper temperatures. A refrigeration coil 8 connects the two portions of refrigeration supply/return tubes 7 also in a manner well known in the art.

Referring now again to FIG. 4, there is shown a perspective view of the inventive removable condenser 1 (alternate embodiments shown in FIGS. 1-3) mounted on the enclosure of conventional freeze dryer 13 with refrigeration supply/return tubes 7 and connect/disconnect fittings 6 disposed on the outside of both condenser 1 and freeze dryer enclosure 13. A vacuum chamber 10 and vacuum seal 9 are components of a freeze dryer.

Referring now again to FIG. 5, there is shown a perspective view of an alternate embodiment of the inventive removable condenser 1 mounted to the enclosure 13 of a conventional freeze dryer with a fixed refrigeration system, not shown, disposed within the housing of condenser 1. The refrigeration system transfers thermally to removable condenser 1 without the need for connect/disconnect fittings.

Referring now again to FIG. 6, there is shown a cut-away view of an alternative embodiment of the inventive removable condenser 1, showing vacuum chamber 10 and a plurality of trays supported by shelves 12, preferably heated. Condenser 1 is operatively connected to vacuum chamber 10 in freeze dryer. A vessel site glass 4 allows a user to view into the collector 1 during the drying process. Thermally conductive interface 5 facilitates the transfer of heat from removable condenser 1 to refrigeration coil 8.

In operation, after each run, an operator removes samples from shelves 12 and turns on a hot gas defrost to melt the ice and allow it to drain from drain port 11. Once all moisture is removed, the freeze dryer may be cleaned and prepped for the next run. Removable condenser 1 allows an operator to trap terpenes and remove them from the freeze dryer to be processed offline, so a new cycle can be started immediately with a separate condenser 1. The system also allows ice to slowly melt in a sealed container that can be refrigerated during the melt process, minimizing lost terpenes.

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a great number of variations of the devices, device components, and method steps set forth in the present description. As will be obvious to one of skill in the art, methods and devices useful for the present methods can include a great number of optional composition and processing elements and steps.

Whenever a range is given in the specification, for example, a temperature range, a time range, or a composition or concentration range, all intermediate ranges and subranges, as well as all individual values included in the ranges given are intended to be included in the disclosure. It will be understood that any subranges or individual values in a range or subrange that are included in the description herein can be excluded from the claims herein.

All patents and publications mentioned in the specification are indicative of the levels of skill of those skilled in the art to which the invention pertains. References cited herein are incorporated by reference herein in their entirety to indicate the state of the art as of their publication or filing date and it is intended that this information can be employed herein, if needed, to exclude specific embodiments that are in the prior art. For example, when compositions of matter are claimed, it should be understood that compounds known and available in the art prior to Applicant's invention, including compounds for which an enabling disclosure is provided in the references cited herein, are not intended to be included in any composition of matter claims herein.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of," and "consisting of" may be replaced with either of the other two terms. The invention illustratively described herein suitably may be practiced in the absence of any element or elements, limitation or limitations which is not specifically disclosed herein.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims:

1. An extraction freeze drying system for extracting material, comprising:

a) a freeze dryer having heating elements, a vacuum chamber, and at least one collection tray configured to contain the material;

b) a first removable collector vessel operatively and removably connected to the vacuum chamber of the freeze dryer to deliver water vapor from the vacuum chamber to the first removable collector, the first removable collector vessel configured to connect to a refrigeration coil connected to a refrigeration system to cool the first removable collector vessel and provide a temperature delta between the material and the first removable collector vessel, wherein a vacuum seal is configured to seal the first removable collector vessel to the vacuum chamber at an open end of the first removable collector vessel; and c) a lid configured to selectively seal the open end of the first removable collector vessel.

2. The extraction freeze drying system in accordance with claim 1, further comprising a second removable collector vessel for replacing the first removable collector vessel upon removal thereof from the freeze dryer.

3. The extraction freeze drying system in accordance with claim 2, wherein the first and second removable collectors are jacketed vessels, wherein the jacketed vessels each include a jacket configured to contain a fluid therein.

4. The extraction freeze drying system in accordance with claim 3, further comprising fittings configured to connect each jacket to the refrigeration system.

5. The extraction freeze drying system in accordance with claim 4, wherein the fittings are quick disconnect fittings operatively connected to the jacketed vessels to allow removal thereof without leaking fluid.

6. The extraction freeze drying system in accordance with claim 1, wherein the sealable lid comprises a drain valve and spout to aid in pouring off water or terpenes during the separation process.

7. The extraction freeze drying system in accordance with claim 1, wherein the first removable collector vessel further comprises a sight glass for allowing a user to monitor condensate collection during a drying process.

* * * * *